(12) United States Patent
Top

(10) Patent No.: US 7,815,126 B2
(45) Date of Patent: *Oct. 19, 2010

(54) CONTACTLESS ACTIVATION SYSTEMS AND METHODS

(75) Inventor: Mustafa Top, Foster City, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,124

(22) Filed: Oct. 16, 2008

(65) Prior Publication Data

US 2009/0039149 A1    Feb. 12, 2009

(51) Int. Cl.
 *G06K 19/06* (2006.01)
(52) U.S. Cl. .................. 235/492; 235/375; 235/380; 235/382; 235/382.5; 235/451; 235/487
(58) Field of Classification Search ............ 235/375, 235/380, 451, 487, 492, 382, 382.5, 439, 235/443, 448
See application file for complete search history.

(56) References Cited

U.S. PATENT DOCUMENTS

| | | | | |
|---|---|---|---|---|
| 4,384,288 A * | 5/1983 | Walton | ......... | 340/5.8 |
| 6,037,879 A * | 3/2000 | Tuttle | ......... | 340/10.4 |
| 6,202,932 B1 * | 3/2001 | Rapeli | ......... | 235/491 |
| 6,588,660 B1 * | 7/2003 | Buescher et al. | ......... | 235/382 |
| 7,100,835 B2 * | 9/2006 | Selker | ......... | 235/492 |
| 2002/0043566 A1 * | 4/2002 | Goodman et al. | ......... | 235/492 |
| 2002/0186145 A1 * | 12/2002 | Chainer et al. | ......... | 340/870.16 |
| 2003/0132301 A1 * | 7/2003 | Selker | ......... | 235/487 |
| 2003/0213974 A1 * | 11/2003 | Armstrong et al. | ......... | 257/184 |
| 2004/0012496 A1 | 1/2004 | De Souza et al. | | |
| 2005/0173543 A1 * | 8/2005 | Ruping et al. | ......... | 235/492 |
| 2007/0134042 A1 * | 6/2007 | Meyerhofer | ......... | 400/521 |

FOREIGN PATENT DOCUMENTS

| | | |
|---|---|---|
| DE | 199 14 587 A1 | 10/2000 |
| DE | 100 16 716 A1 | 8/2001 |
| EP | 1 094 418 A2 | 4/2001 |
| FR | 2 828 953 A | 2/2003 |
| GB | 2 407 189 A | 4/2005 |

* cited by examiner

*Primary Examiner*—Thien M. Le
*Assistant Examiner*—Tuyen K Vo
(74) *Attorney, Agent, or Firm*—Bradley K. DeSandro; Quarles & Brady LLP

(57) ABSTRACT

Methods and systems for enabling contactless communications with a contactless card are disclosed. A contactless card may include a contactless interface activation mechanism that includes one or more sense contacts, a processor, and a processor-readable storage medium in communication with the processor. The processor-readable storage medium may contain programming instructions for performing one or more applications. The processor may be in a protected state in which the processor is prevented from performing the instructions for at least one application in the processor-readable storage medium unless a load is placed on at least one sense contact.

18 Claims, 16 Drawing Sheets

Chip contacts of the contact interface

Chip contacts of the contact interface with light sensor

Figure 10

TABLE 1

Coverage-Load/Light Verification Table for First Embodiment

| Protection Coverage | | Limits of coverage | Load/Light Verification | | | | | | |
|---|---|---|---|---|---|---|---|---|---|
| | | | Only Once | Intervals with Random Periods | Intervals with Fixed Periods | Limited Number of Intervals | Unlimited Number of Intervals | Conditional Based on Defined Rules | Always |
| Verify load/light before beginning of contactless communication | Frequency Protection | all | ✓ | — | — | — | — | — | — |
| | Data Protection | all | ✓ | — | — | — | — | — | — |
| | Command-Response Protection | all | ✓ | — | — | — | — | — | — |
| | Application Protection | all | ✓ | — | — | — | — | — | — |
| | Conditional Protection | — | — | — | — | — | — | — | — |
| Verify load/light during contactless communication | Frequency Protection | — | — | — | — | — | — | — | — |
| | Data Protection | — | — | — | — | — | — | — | — |
| | Command-Response Protection | — | — | — | — | — | — | — | — |
| | Application Protection | — | — | — | — | — | — | — | — |
| | Conditional Protection | — | — | — | — | — | — | — | — |

Figure 11

TABLE 2

Coverage-Load/Light Verification Table for Second Embodiment

| Protection Coverage | | Limits of coverage | Load/Light Verification | | | | | | |
|---|---|---|---|---|---|---|---|---|---|
| | | | Only Once | Intervals with Random Periods | Intervals with Fixed Periods | Limited Number of Intervals | Unlimited Number of Intervals | Conditional Based on Defined Rules | Always |
| Verify load/light before beginning of contactless communication | Frequency Protection | all | ✓ | — | — | — | — | — | — |
| | Data Protection | all | ✓ | — | — | — | — | — | — |
| | Command-Response Protection | all | ✓ | — | — | — | — | — | — |
| | Application Protection | all | ✓ | — | — | — | — | — | — |
| | Conditional Protection | — | — | — | — | — | — | — | — |
| Verify load/light during contactless communication | Frequency Protection | all | — | — | — | — | — | — | ✓ |
| | Data Protection | all | — | — | — | — | — | — | ✓ |
| | Command-Response Protection | all | — | — | — | — | — | — | ✓ |
| | Application Protection | all | — | — | — | — | — | — | ✓ |
| | Conditional Protection | — | — | — | — | — | — | — | — |

Figure 12

TABLE 3

Coverage-Load/Light Verification Table for Third Embodiment

| Protection Coverage | | Limits of coverage | Only Once | Load/Light Verification | | | | | |
|---|---|---|---|---|---|---|---|---|---|
| | | | | Intervals with Random Periods | Intervals with Fixed Periods | Limited Number of Intervals | Unlimited Number of Intervals | Conditional Based on Defined Rules | Always |
| Verify load/light before beginning of contactless communication | Frequency Protection | — | | — | — | — | — | — | — |
| | Data Protection | — | — | — | — | — | — | — | — |
| | Command-Response Protection | — | | — | — | — | — | — | — |
| | Application Protection | — | | — | — | — | — | — | — |
| | Conditional Protection | — | | — | — | — | — | — | — |
| Verify load/light during contactless communication | Frequency Protection | — | | — | — | — | — | — | — |
| | Data Protection | Limited to Protected Application | ✓ | — | — | — | — | — | — |
| | Command-Response Protection | Limited to Protected Application | ✓ | — | — | — | — | — | — |
| | Application Protection | Limited | ✓ | — | — | — | — | — | — |
| | Conditional Protection | — | | — | — | — | — | — | — |

Figure 13    TABLE 4

Coverage-Load/Light Verification Table for Fourth Embodiment

| Protection Coverage | | Limits of coverage | Load/Light Verification | | | | | | |
|---|---|---|---|---|---|---|---|---|---|
| | | | Only Once | Intervals with Random Periods | Intervals with Fixed Periods | Limited Number of Intervals | Unlimited Number of Intervals | Conditional Based on Defined Rules | Always |
| Verify load/light before beginning of contactless communication | Frequency Protection | — | — | — | — | — | — | — | — |
| | Data Protection | — | — | — | — | — | — | — | — |
| | Command-Response Protection | — | — | — | — | — | — | — | — |
| | Application Protection | — | — | — | — | — | — | — | — |
| | Conditional Protection | — | — | — | — | — | — | — | — |
| Verify load/light during contactless communication | Frequency Protection | — | — | — | — | — | — | — | — |
| | Data Protection | — | — | — | — | — | — | — | — |
| | Command-Response Protection | — | — | — | — | — | — | — | — |
| | Application Protection | Limited | ✓ | — | — | — | — | — | — |
| | Conditional Protection | Transaction Amount | ✓ | — | — | — | — | — | — |

Figure 14

TABLE 5

Coverage-Load/Light Verification Table for Fifth Embodiment

| | | | | Load/Light Verification | | | | |
|---|---|---|---|---|---|---|---|---|
| Protection Coverage | | Limits of coverage | Only Once | Intervals with Random Periods | Intervals with Fixed Periods | Limited Number of Intervals | Unlimited Number of Intervals | Conditional Based on Defined Rules | Always |
| Verify load/light before beginning of contactless communication | Frequency Protection | — | — | — | — | — | — | — | — |
| | Data Protection | | | | | | | | |
| | Command-Response Protection | — | — | — | — | — | — | — | — |
| | Application Protection | — | — | — | — | — | — | — | — |
| | Conditional Protection | — | — | — | — | — | — | — | — |
| Verify load/light during contactless communication | Frequency Protection | — | — | — | — | — | — | — | — |
| | Data Protection | — | — | — | — | — | — | — | — |
| | Command-Response Protection | REQB/ WUPB | ✓ | — | — | — | — | — | — |
| | Application Protection | — | — | — | — | — | — | — | — |
| | Conditional Protection | AFI = '00' | ✓ | — | — | — | — | — | — |

Figure 15

TABLE 6

Coverage-Load/Light Verification Table for Sixth Embodiment

| | | | | Load/Light Verification | | | | | |
|---|---|---|---|---|---|---|---|---|---|
| Protection Coverage | | Limits of coverage | Only Once | Intervals with Random Periods | Intervals with Fixed Periods | Limited Number of Intervals | Unlimited Number of Intervals | Conditional Based on Defined Rules | Always |
| Verify load/light before beginning of contactless communication | Frequency Protection | — | — | — | — | — | — | — | — |
| | Data Protection | — | — | — | — | — | — | — | — |
| | Command-Response Protection | — | — | — | — | — | — | — | — |
| | Application Protection | — | — | — | — | — | — | — | — |
| | Conditional Protection | — | — | — | — | — | — | — | — |
| Verify load/light during contactless communication | Frequency Protection | all | — | — | ✓ | ✓ | — | ✓ | — |
| | Data Protection | all | — | — | ✓ | ✓ | — | ✓ | — |
| | Command-Response Protection | all | — | — | ✓ | ✓ | — | ✓ | — |
| | Application Protection | all | — | — | ✓ | ✓ | — | ✓ | — |
| | Conditional Protection | — | — | — | — | — | — | — | — |

CONTACTLESS ACTIVATION SYSTEMS AND METHODS

CROSS-REFERENCE TO RELATED APPLICATIONS

This application claims priority to U.S. Provisional Application Ser. No. 60/691,046, titled "Contactless Activation Systems And Methods", filed on Jun. 16, 2005, and to U.S. patent application Ser. No. 11/424,357, filed on Jun. 15, 2006, titled "Contactless Activation Systems And Methods", now U.S. Pat. No. 7,438,236, which are incorporated herein by reference.

BACKGROUND

Technological improvements have allowed businesses and individuals to engage in transactions in new and expanding environments. For example, wireless transactions can be conducted by any electronic device which is enabled to communicate information over any wireless interface including infrared, radio frequency, laser, or any other frequency, communication means or protocol for use therewith.

For example, radio frequency enabled credit cards, debit cards, loyalty cards and the like, collectively known as contactless cards, typically comprise an integrated circuit and a coiled antenna. The integrated circuit of a contactless card comprises a processor, a processor-readable storage medium, such as random access memory ("RAM") and/or electrically erasable-programmable read only memory ("EEPROM"), and a modulator/demodulator for impressing data on a radio frequency wave and decoding received data. The antenna is coiled through the interior of the contactless card and is used to communicate data with an external location. In addition, the coiled antenna can inductively couple with an external magnetic, electric and/or electromagnetic field to serve as a power source for the contactless card.

Contactless cards provide issuers with the opportunity to provide cardholders with innovative technology that, due to the increased convenience of use and speed of completing a transaction, will, in general, by preferred by cardholders. In addition, contactless cards provide increased cost savings to merchants due, at least, to reduced maintenance costs associated with contactless card readers versus contact-based card readers. Further, contactless cards provide merchants with the opportunity for increased revenues due, at least, to the reduced time needed at check-out for payment to be provided by the consumer using a contactless card. Contactless integrated circuit cards also provide significant convenience to the cardholder since such cards allow a consumer to conduct a transaction more quickly and conveniently than in a contact-based environment. For example, a contactless card can remain in the physical possession of the cardholder at all times since all of the data necessary to complete a transaction can be transferred via a wireless interface. This feature provides the cardholder with an increased level of security as it reduces the likelihood that the card will pass through an unauthorized reader that steals data from the card for the purpose of creating a counterfeit card.

Nonetheless, such benefits must be balanced against potential security breaches stemming from the use of contactless cards that are absent in a contact-based environment. In particular, security issues can arise when information that is transmitted between a card and a contactless card reader is intercepted during transmission. Potential security breaches stemming from the use of contactless cards include data "hijacking", data "pick-pocketing" and "man in the middle" attacks.

A hijacking attack occurs when a party not involved in a contactless card transaction taps into a data exchange occurring as part of the transaction to extract information transmitted between the contactless card and a contactless card reader. Not surprisingly, the ability of a fraudulent device to obtain valid data is inversely proportional to the distance between the hijacking device and the card reader and/or the contactless card. In other words, the likelihood of the hijacking device successfully obtaining valid data from the transaction increases as the distance between the hijacking device and a card reader and/or a contactless card decreases.

A pick-pocketing attack occurs when a fraudulent device activates and reads a contactless card without the cardholder's knowledge. Data pick-pocketing may even occur when the card is not being used in a transaction. The pick-pocketing device can activate the card and initiate a data exchange. Data is obtained from the card by the pick-pocketing device using legitimate commands that cause the card to react as if the data exchange were legitimate. Since a contactless card transmits data as radio frequency waves propagating from a single source, a contactless card can be subject to such an attack in locations and from sources of which the cardholder is not aware. Again, the ability for a fraudulent device to obtain valid data is inversely proportional to the distance between the contactless card and the fraudulent device.

A "man in the middle" attack occurs when an exchange between a contactless card and a legitimate card reader is unknowingly intercepted by an unauthorized device. The unauthorized device intercepts the data transmitted by the card, copies or otherwise manipulates such data, and transmits such data to the legitimate card reader. When the card reader returns data or transmits commands to the card, the unauthorized device first intercepts and then transmits such data/commands to the card. The transaction can continue with the unauthorized device intercepting and re-transmitting all data/commands exchanged between the card and the legitimate card reader. As such, the unauthorized device has access to all data for the transaction without the knowledge of either the cardholder or the merchant operating the card reader.

Accordingly, consumers and organizations have concerns regarding the possibility that a contactless card could permit information to be taken without the cardholder's authorization. What is needed is a method and system for inhibiting unauthorized accesses to contactless cards.

A need exists for a method and system that permits a cardholder of a contactless card to determine when a transaction is initiated.

A further need exists for a method and system that controls data reception and transmission for a contactless card.

The present disclosure is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the"

include plural references unless the context clearly dictates otherwise. Thus, for example, reference to a "transaction" is a reference to not only a financial transaction, such as between a merchant and a consumer, but any other exchange of value, data or information between one or more persons, entities, accounts or locations. Unless expressly stated otherwise, all undefined technical and scientific terms used herein have the same meanings as commonly understood by one of ordinary skill in the art, while all defined technical and scientific terms shall be deemed to include the same meaning as commonly understood by one of ordinary skill in the art with the stated definition. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

A contactless interface activation mechanism may be used to protect a contactless card from contactless communications that a cardholder does not desire and/or anticipate. The manner in which the mechanism is used may be based upon the anticipated uses of the contactless card and the associated risks of such uses.

The contactless interface activation mechanism may be placed within the antenna. Such a mechanism may prevent responses to contactless interface commands by preventing power from being received by the contactless card and/or by not responding to received commands.

In an embodiment, the contactless interface activation mechanism may be enabled using a load verification process. The load verification process may require a cardholder to place a load upon one or more contacts. The load may be, for example, a part of the cardholder's body, such as the cardholder's thumb. The load verification process may determine whether the load is placed on the contacts during a contactless communication session. If the load is not verified, the communication session may be terminated (or not initiated) or the verification process may repeat until a load on the one or more contacts is verified, the card is withdrawn from a field, and/or the card is powered down.

In an alternate embodiment, the contactless interface activation mechanism may be enabled using a light verification process. The light verification process may require the reception of at least a particular intensity of light on one or more light sensors. The light may be, for example, ambient light from the card's environment when the card is in use. The light verification process may determine whether the intensity of the received light is sufficient to permit a contactless communication session. If the light intensity is insufficient for verification, the communication session may be terminated (or not initiated) or the verification process may repeat until either light having sufficient intensity is received, the card is withdrawn from a field and/or the card is powered down.

In an embodiment, the light verification process may determine whether the frequency and/or determined coding of the received light may permit a contactless communication session. Light coding may include, for example, a time dependent frame, a binary value or a modulated signal that the card recognizes as a coded or modulated light for verification. If the light frequency and/or determined coding of light is not verified, the communication session may be terminated (or not initiated), or the verification process may repeat until light having the expected frequency and/or coding is received, the card is withdrawn from a field and/or the card is powered down.

BRIEF DESCRIPTION OF THE DRAWINGS

Aspects, features, benefits and advantages of the embodiments of the present invention will be apparent with regard to the following description, appended claims and accompanying drawings where:

FIGS. 10-15 are, respectively, Tables 1-6

TERMINOLOGY

Figure 1:
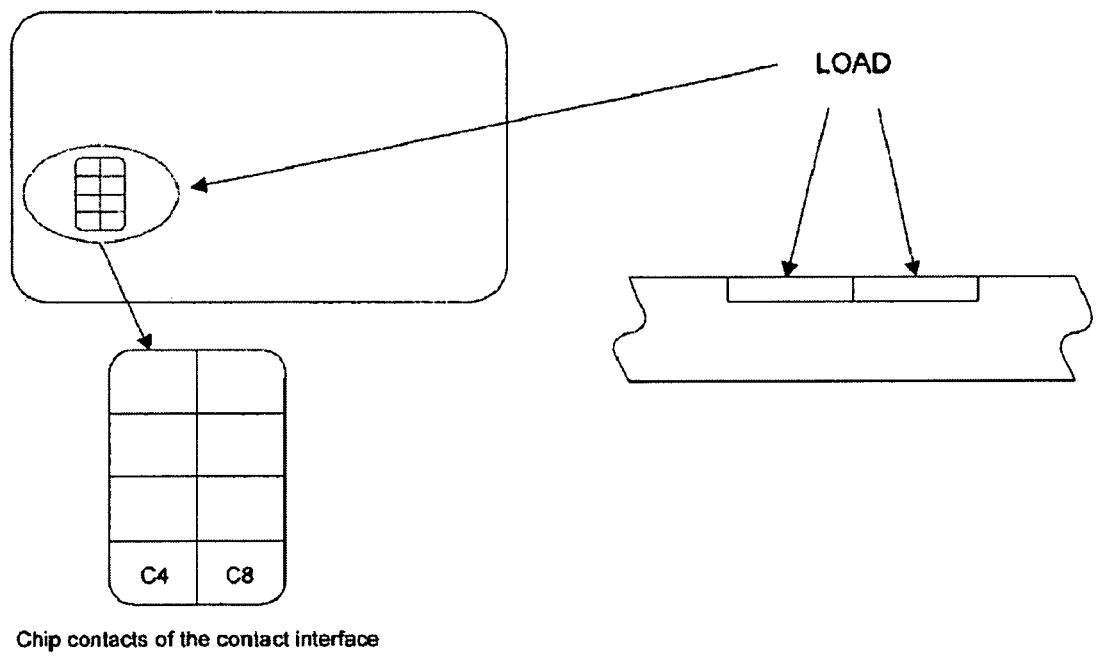
FIG. 1 depicts a contactless card including exemplary sense contacts according to an embodiment.

An application may include a sequence of operations performing a payment or non-payment transaction. The application may be available through a wireless interface on a contactless card. The application may include a financial transaction, a transportation transaction, an identification transaction and the like.

Contactless communication may include a data exchange through a wireless interface including one or more polling data transfers that determine whether a contactless card/card reader is within range. Contactless communication may perform, for example, anti-collision procedures, initialize the card, determine protocols to perform in the communication procedure (i.e., protocols supported by the card) and perform one or more operations of an application.

A card may include any physical media used in contactless communication that is designed to be assigned to a cardholder. Such cards may include credit cards, debit cards, stored value cards, smart cards, loyalty cards and the like having a wireless interface. A card may include an integrated circuit and a coiled antenna. The integrated circuit for a contactless card may include a processor, memory, such as random access memory ("RAM") and/or electrically erasable-programmable read only memory ("EEPROM"), and a modulator/demodulator for impressing data on, for example, a radio frequency wave and for decoding received data. The antenna may be coiled through the interior of the contactless card and may be used to communicate data with an external location. In addition, the coiled antenna may inductively couple with an external electromagnetic field and serve as a power source for the card.

A command may be data sent by a card reader via a wireless interface to request information from a card, or vice versa.

Exception handling may occur when a card disables contactless communication fully or partly for an identified time period (including permanently) or a randomized time period, for identified or randomized commands and/or values, and/or for identified frequency ranges and/or values. The card may take identified actions during or following an exception occurrence. For example, the card may change flags and/or counters, change data in the card and/or send a specific response via a wireless interface.

A field may refer to a magnetic field, an electric field or an electromagnetic field generated by a card reader that enables a card to power up and/or communicate via a wireless interface.

A frequency range may include a contiguous set of frequencies at which a card may communicate with a card reader via a wireless interface. One or more frequency ranges may be available for a particular card. For example, vicinity communications may utilize a first frequency range, while proximity communications may utilize a second frequency range.

A lighted state may occur when one or more light sensors for a card are exposed to light having a sufficient intensity, accurate coding and/or desired modulation or frequency.

A light sensor may include a sensor point on a card that is used for light verification. A light sensor may also be used to provide additional functions.

Light verification may be a process by which a contactless card verifies the existence of light on a light sensor with identified features such as intensity, frequency, coding or modulation. The light verification process may include one or more attempts to verify the received light.

A load may include a resistive, capacitive and/or inductive element that can be applied, for example, on a sense contact of a card. The load may be, for example, a cardholder.

A loaded state may occur when a sense contact of a card is touched or pressed with a load.

Load verification may be a process by which a contactless card verifies the existence of a load on a sense contact. The load verification process may include one or more attempts to verify the load.

A protected state may occur when a contactless card partly or fully disables contactless communication. For example, a card may exhibit the protected state until a load verification process has completed and/or a light verification process has completed.

Protection coverage may refer to one or more applications and/or components of a contactless card that are inaccessible via contactless communication when the card is in the protected state.

A power-up state may occur when a contactless card that has been assigned to a cardholder receives power via, for example, a field.

A response may include a transmission by a card that replies to a command sent by a card reader, or vice versa. The response may be sent via a wireless interface.

A sense contact may include one or more contact points on a card that are used for load verification. A sense contact may also be used to provide additional functions.

An unprotected state may occur when a contactless card is partly or fully enabled to engage in contactless communication.

DETAILED DESCRIPTION

A contactless card may communicate or transmit data stored on the card via an antenna. The antenna may be linked to a processor and/or a memory which contains the data. When the contactless card is in proximity to a compatible device that has the appropriate protocols, such as a card reader, the card may communicate with the device.

A contactless interface activation mechanism may be used to protect a contactless card from contactless communications that are not desired by a cardholder. The limits and coverage for the protection may be defined based on the anticipated uses of the contactless card and the associated risks of such uses.

Permissions for a contactless communication session may be based on verification performed by the contactless interface activation mechanism for the card. In an embodiment, a contactless card may be in a protected state before the card responds to an interrogative command. The card may remain in the protected state until an initial verification process using the contactless interface activation mechanism is successful. After the verification completes successfully, the card may respond to one or more commands. The card may perform verification at predetermined intervals during the communication session or based on the satisfaction of one or more conditions, such as receiving a particular command, data or the like. In an alternate embodiment, a contactless card may be in a protected state for selected applications and in an unprotected state for other applications prior to verification. In such an embodiment, the unprotected applications may be continuously enabled to respond to commands received through the wireless interface. The protected applications may not respond until verification successfully completes.

Load verification may be applied such that the load on the contact is verified, for example, only once, continuously, at predetermined intervals, upon the occurrence of a condition and/or at a random interval. The time between executions of the load verification process conditioned upon other factors may be referred to as a dependent interval. For example, the card may check the load with intervals of x period and f frequency if the card receives one or more of a particular command, particular data and/or a selection attempt for a particular application on the card.

FIG. 1 depicts a contactless card including exemplary sense contacts according to an embodiment. As shown in FIG. 1, a contactless card may have one or more sense contacts on the surface of the card. The contactless card may include contactless and EMV-compliant contact interfaces. In an embodiment, a dedicated contact may be used as a sense contact for load verification. In an embodiment, a plurality of contacts may be used as sense contacts in combination to verify a load.

In an embodiment, a light dependent security circuit (LDSC) may be used to disable the antenna from receiving contactless communications when the card is not in use. A contactless card may be stored in a dark location, such as a wallet, purse, bag, pocket or the like, enable the card when a user does not desire to use the card. The card may be removed from the location and exposed to light having sufficient intensity and/or identified frequency, coding and/or modulation to activate the card when the user desires to use the card in communication with a contactless device.

In an embodiment, light may be sensed via one or more light sensors. The light sensor may be in communication with a LDSC, which is in communication with, for example, a communication chip. In an embodiment, at least one light sensor may be located on the card. If only one light sensor is on the card and only the side of the card without the light sensor is sufficiently illuminated, contactless communication may be disabled. In an embodiment, a light sensor may be placed on each side of a card to ensure that contactless communication is enabled in a sufficiently lit environment. In an alternate embodiment, the light sensor may be adjusted to permit low light levels to enable contactless communication.

Light verification may be applied such that the light intensity detected by the light sensor is verified, for example, only once, continuously, at predetermined intervals, upon the occurrence of a condition and/or at a random interval. The time between executions of the light verification process that are conditioned upon other factors may be referred to as a dependent interval. For example, the card may check the environment's light intensity with intervals of x period and f frequency if the card receives one or more of a particular command, particular data and/or a selection attempt for a particular application on the card.

In an alternate embodiment, light verification may be applied such that the correct frequency, binary coding and/or modulation of light detected by the light sensor is verified. For example, the card may verify binary coded light generated by a light transmitter on or by the card reader with intervals of x period and f frequency if the card receives one or more of a particular command, particular data and/or a selection attempt for a particular application on the card.

Figure 2:
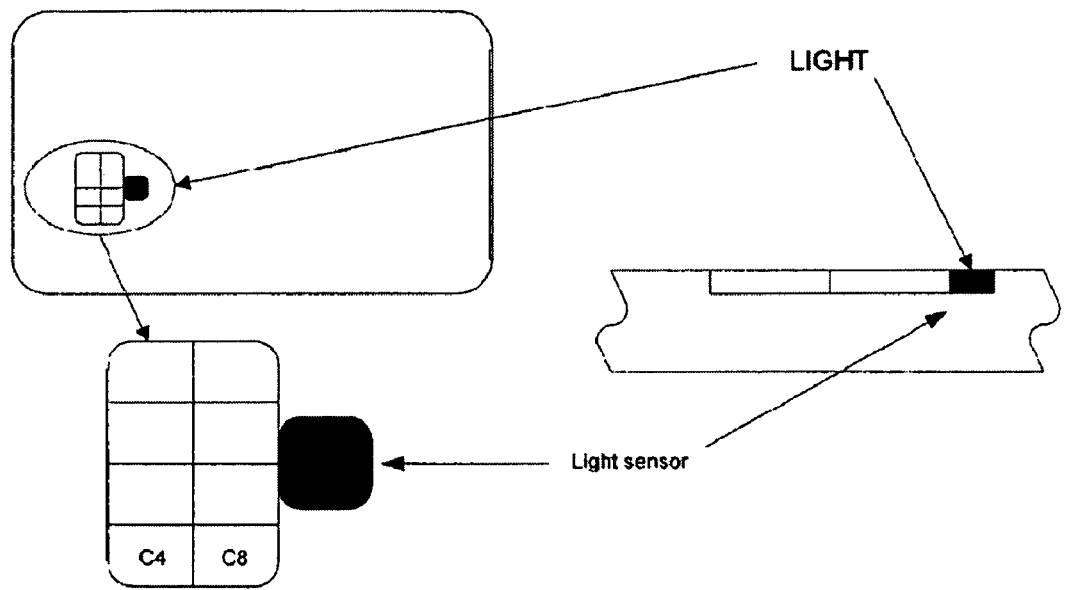
FIG. 2 depicts a contactless card including exemplary light sensors according to an embodiment.

FIG. 2 depicts a contactless card including exemplary light sensors according to an embodiment. As shown in FIG. 2, a contactless card may have one or more light sensors on the surface of the card. In an embodiment, the contactless card may include contactless and EMV-compliant contact interfaces. In an embodiment, a plurality of sensors may be used as light sensors in combination to verify correct light reception.

Figure 3:
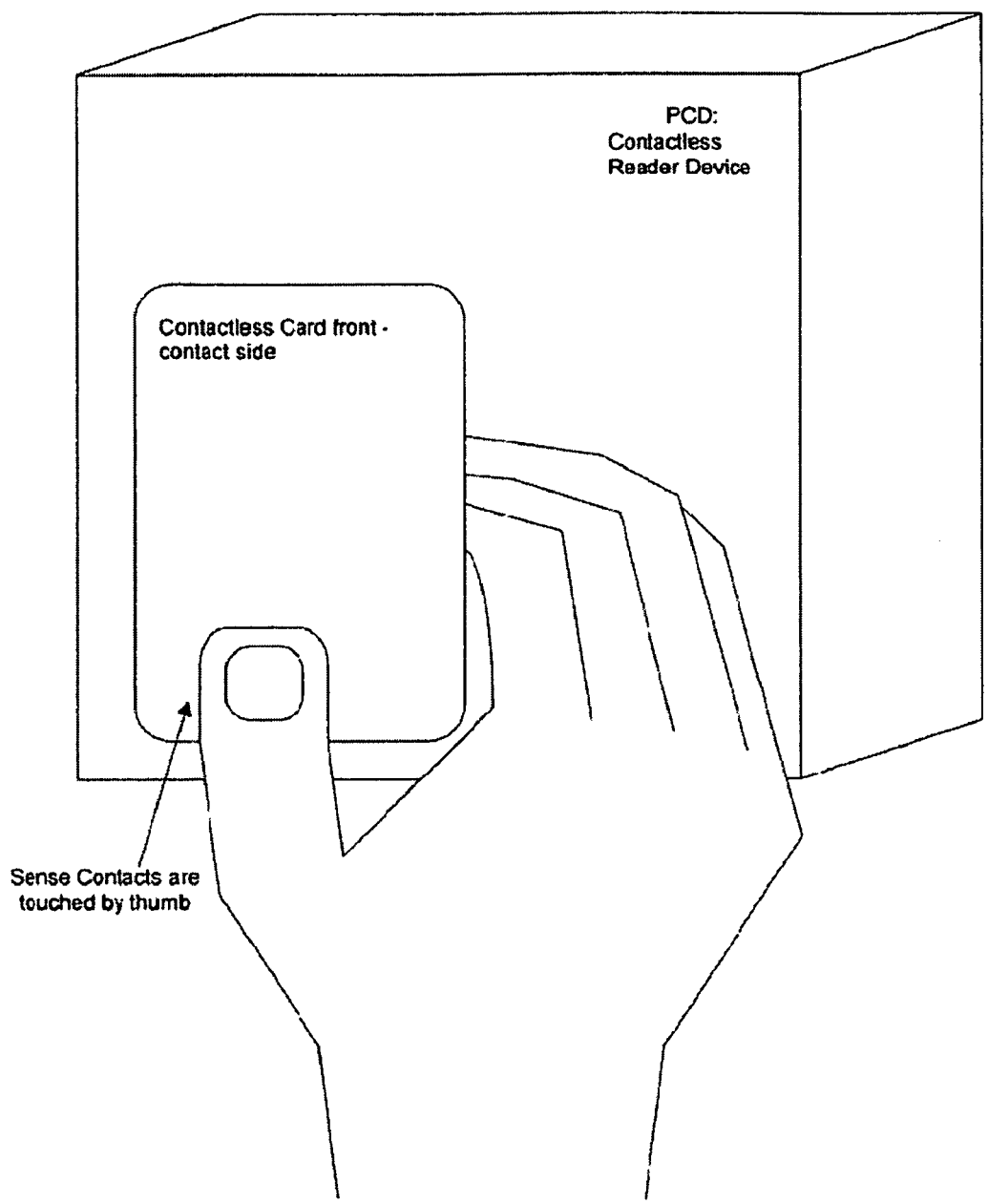
FIG. 3 depicts an exemplary use of a contactless card having sense contacts according to an embodiment.

FIG. 3 depicts an exemplary use of a contactless card having sense contacts according to an embodiment. As shown in FIG. 3, the cardholder may hold the card in such a way that the cardholder's hand contacts one or more sense contacts when the cardholder wishes to permit a transaction with the card. For example, the cardholder's thumb may contact the one or more sense contacts. The cardholder may hold the card proximate to a contactless card reader to engage in a command-response interaction with the card reader.

Figure 3A:
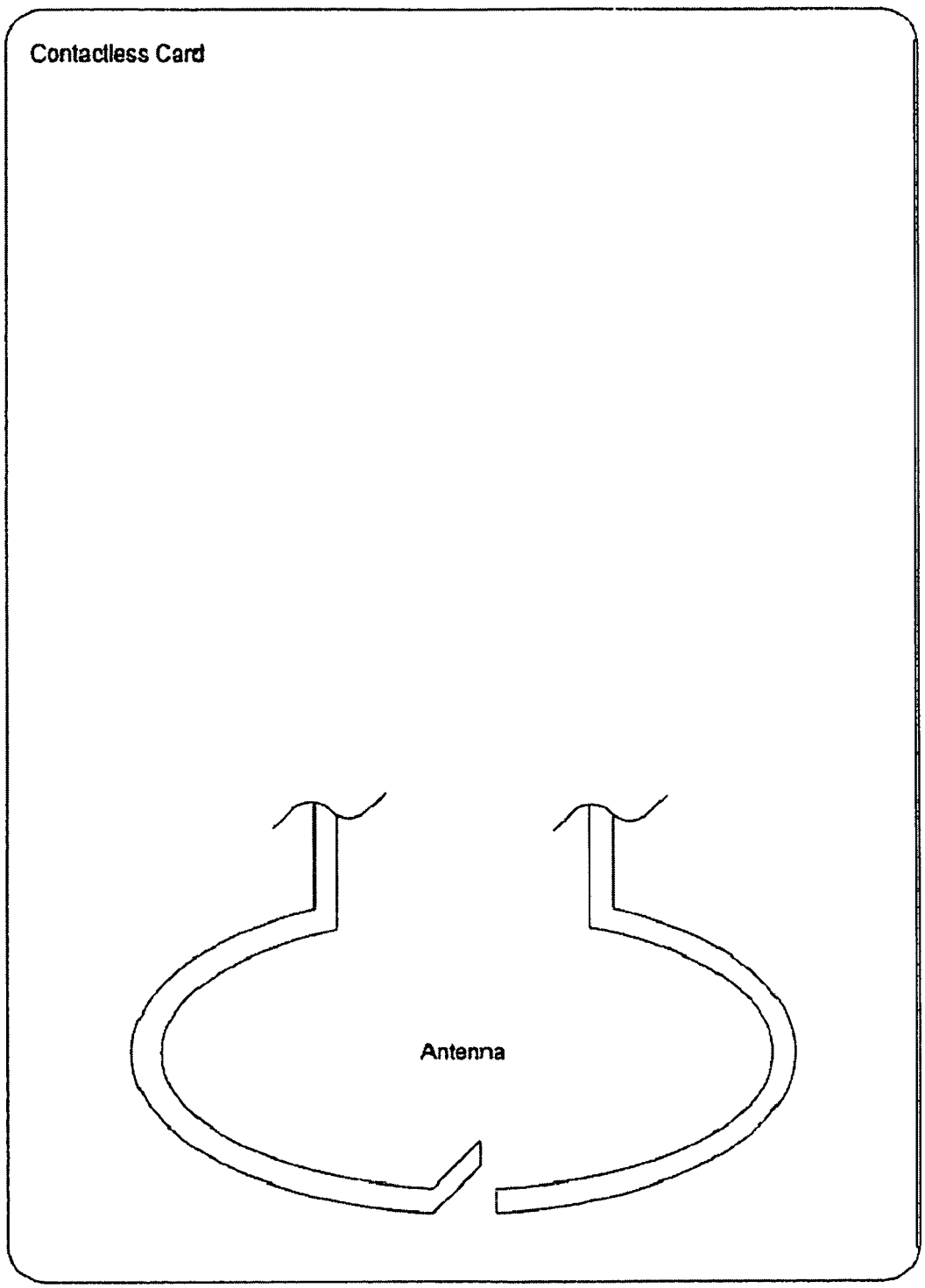
FIG. 3A depicts an exemplary antenna for a contactless card according to an embodiment.

FIG. 3A depicts an exemplary antenna for a contactless card according to an embodiment. As shown in FIG. 3A, the contactless interface activation mechanism may disable the antenna by creating an open circuit within the antenna when the mechanism is disabled. This may prevent the antenna from establishing a successful communication with a card reader. Conversely, the mechanism may be used to complete the antenna by, for example, closing the open circuit within the antenna when the mechanism is enabled. This may allow the antenna to establish a successful communication with a card reader. The circuit may be opened and closed, for example, by use of a push button switch, a toggle switch, a rocker switch or the like. Further, contactless cards may include a local power source, independent of the electromagnetic field, which may be used to open and close various types of switches or other components that may be used to disable and enable the antenna.

In an alternate embodiment, the cardholder may expose the card to light when the cardholder wishes to permit a transaction with the card. For example, the cardholder may remove the card from the user's pocket, wallet, purse or the like to permit light to reach the light sensors. The card may be exposed to light proximate to a contactless card reader to engage in a command-response interaction with the card reader.

Figure 4:
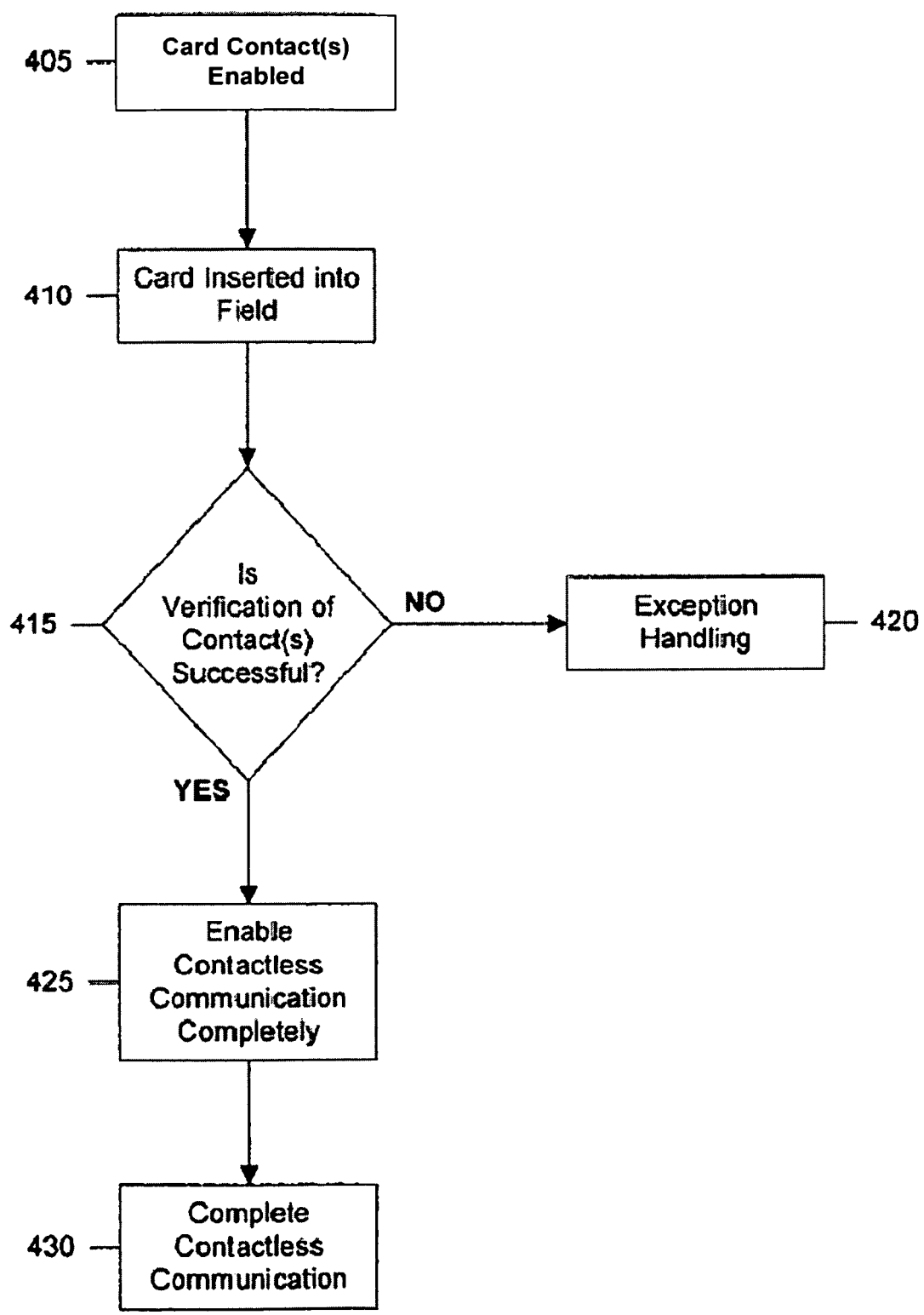
FIGS. 4-9 depict flow diagrams for load verification processes according to embodiments.

FIG. 4 depicts a flow diagram for a load verification process according to a first contactless card embodiment. In the first contactless card embodiment, the card may be fully protected against all contactless communication if the one or more sense contacts are not loaded. A cardholder, for example, may touch the card on the one or more sense contacts when presenting the card to a card reader (i.e., bringing the card within a field produced by the card reader). The card may receive power, for example, from the field and may perform load verification by verifying that one or more of the sense contacts are loaded while the card is within the field. In an embodiment, load verification may be performed once per session. Once load verification is successful, the card may enable complete contactless communication, and the cardholder may remove the load from the one or more sense contacts. The load may first be applied while the card is outside of the field.

As shown in FIG. 4, the one or more sense contacts may initially be unloaded and the card may be in a protected state while the card is outside a field. The one or more sense contacts may then be loaded 405 while the card is outside the field. The card may be brought 410 within the field, and the card may receive power via, for example, the field and/or a battery. In other words, the card may be powered up in a loaded state. In an alternate embodiment, the card may be powered up in an unloaded state. The sense contacts and associated circuitry on the card may determine 415 whether a load verification process is successfully completed. If not, an exception handling procedure may be performed 420. Otherwise, the card may enable 425 contactless communication. The card may communicate without further load verification during a contactless communication session until the communication session completes 430.

Table 1 in FIG. 10, Coverage-Load/Light Verification Table for First Embodiment, may depict the protection coverage and load verification process for the first contactless card embodiment. In the embodiment depicted in Table 1, the load may first be applied outside of the field. The protection coverage may include full contactless communication protection at all frequency ranges for all data, all command-response transmissions and all applications.

Figure 5:
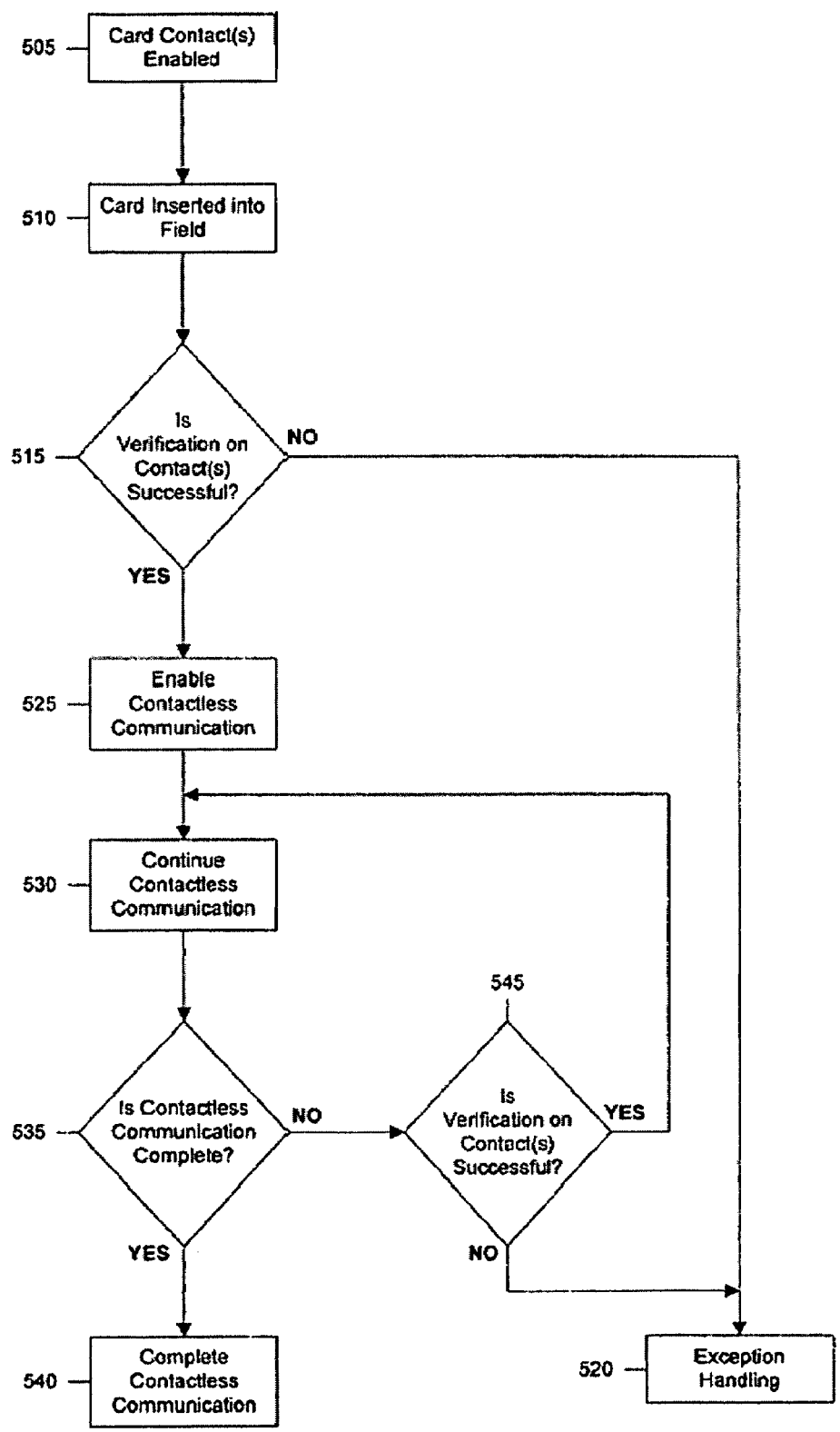

FIG. 5 depicts a flow diagram for a load verification process according to a second contactless card embodiment. In the second contactless card embodiment, the card may be fully protected against all contactless communication if the one or more sense contacts are not loaded. A cardholder, for example, may touch the card on the one or more sense contacts when presenting the card to a card reader (i.e., bringing the card within a field produced by the card reader). The card may receive power, for example, from the field and may perform load verification by verifying that one or more of the sense contacts are loaded while the card is within the field. Load verification may be performed continuously during a contactless communication session. The load may first be applied while the card is outside of the field.

As shown in FIG. 5, the one or more sense contacts may initially be unloaded and the card may be in a protected state while the card is outside a field. The one or more sense contacts may then be loaded 505 while the card is outside the field. The card may be brought 510 within the field, and the card may receive power via, for example, the field and/or a battery. In other words, the card may be powered up in a loaded state. In an alternate embodiment, the card may be powered up in an unloaded state. The sense contacts and associated circuitry on the card may determine 515 whether a load verification process is successfully completed. If not, an exception handling procedure may be performed 520. Otherwise, the card may enable 525 contactless communication. The card may continue 530 performing contactless communication for a communication session. A determination of whether the contactless communication session has ended 535 may be performed continuously during the contactless communication session. If the session has ended, the contactless communication session may be completed 540. If the session is ongoing, the card may determine 545 whether load verification is successful. If the determination is not successful, an exception handling procedure may be performed 520. If the load is verified, the communication session may continue 530.

Table 2 in FIG. 11, Coverage-Load/Light Verification Table for Second Embodiment, may depict the protection coverage and load verification process for the second contactless card embodiment. In the embodiment depicted in Table 2, the load may first be applied outside of the field. The protection coverage may include full contactless communication protection at all frequency ranges for all data, all command-response transmissions and all applications.

Figure 6:
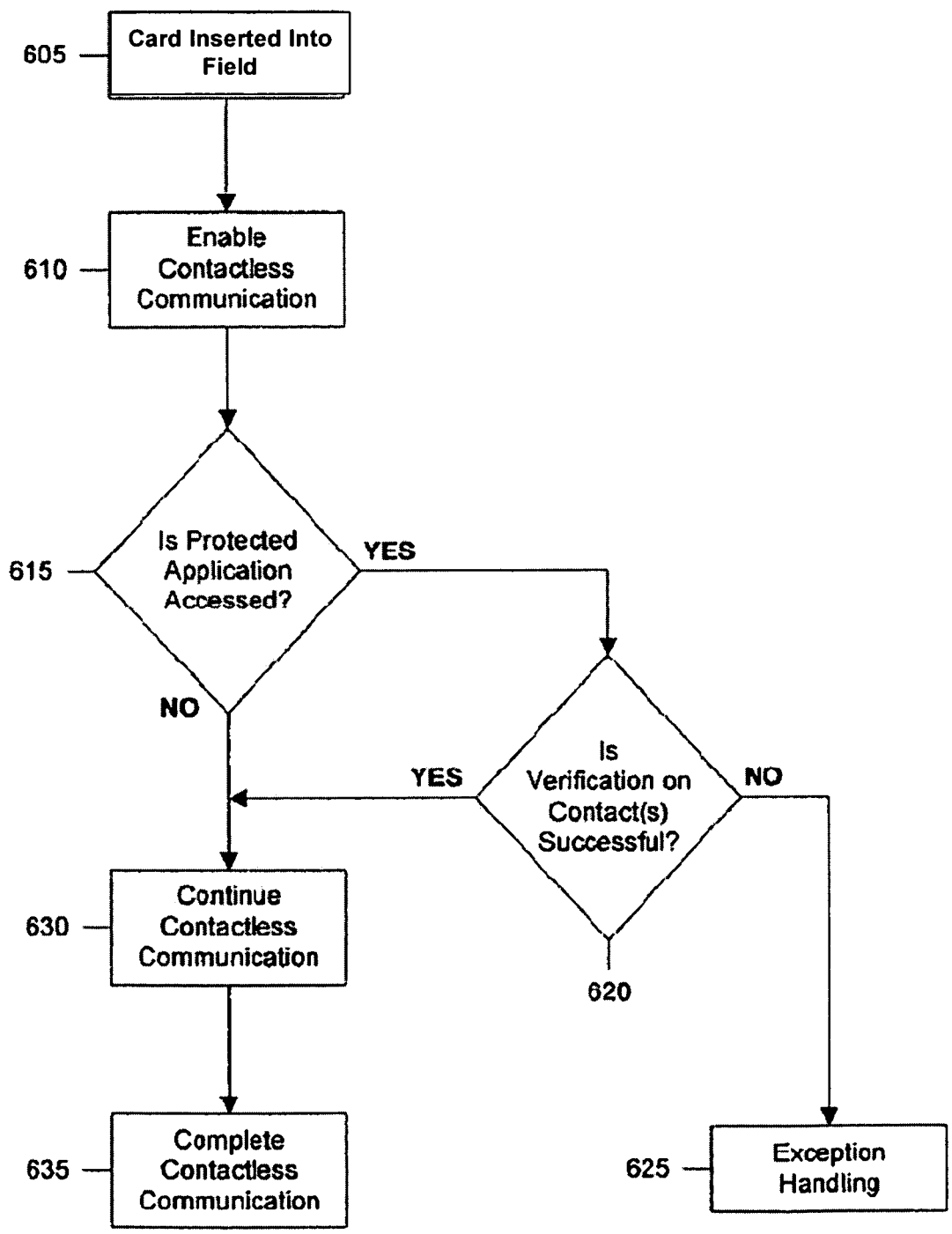

FIG. 6 depicts a flow diagram for a load verification process according to a third contactless card embodiment. In the third contactless card embodiment, the card may be partially protected against contactless communication if the one or more sense contacts are not loaded. The partial protection may be assigned on a per application basis. For unprotected applications, load verification may not be required. For protected applications, load verification may be required prior to execution. To perform load verification, a cardholder, for example, may touch one or more sense contacts of the card while presenting the card to a card reader (i.e., bringing the card within a field produced by the card reader). The card may receive power, for example, from the field and may verify that one or more of its sense contacts are loaded while the card is within the field. In an embodiment, upon successful load verification, the card may enable complete contactless communication, and the cardholder may remove the load from the contacts. The load may first be applied while the card is either inside or outside of the field. In an alternate embodiment (not shown), load verification for protected applications may be performed continuously, at intervals during the communication session, and/or when a protected application is accessed during a communication session.

As shown in FIG. 6, the one or more sense contacts may be unloaded and the card may be inside or outside of a field. The one or more sense contacts may be loaded 605, and power may be engaged in the card via, for example, the field and/or a battery. Contactless communication may be enabled 610 when the card is within the field. The card may determine 615 whether the command from the card reader is directed towards a protected application. If a protected application is selected, the card may determine 620 whether the load has been verified. If the load has not been verified, an exception handling procedure may be performed 625. Otherwise, the card may continue 630 the contactless communication. One access to the protected application and/or the communication session completes 635, the card may disable access to protected applications.

Table 3 in FIG. 12, Coverage-Load/Light Verification Table for Third Embodiment, may depict the protection coverage and load verification process for the third contactless card embodiment. In the embodiment depicted in Table 3, the load may first be applied either inside or outside of the field. The protection coverage may include data protection and command-response protection for protected applications only.

Figure 7:
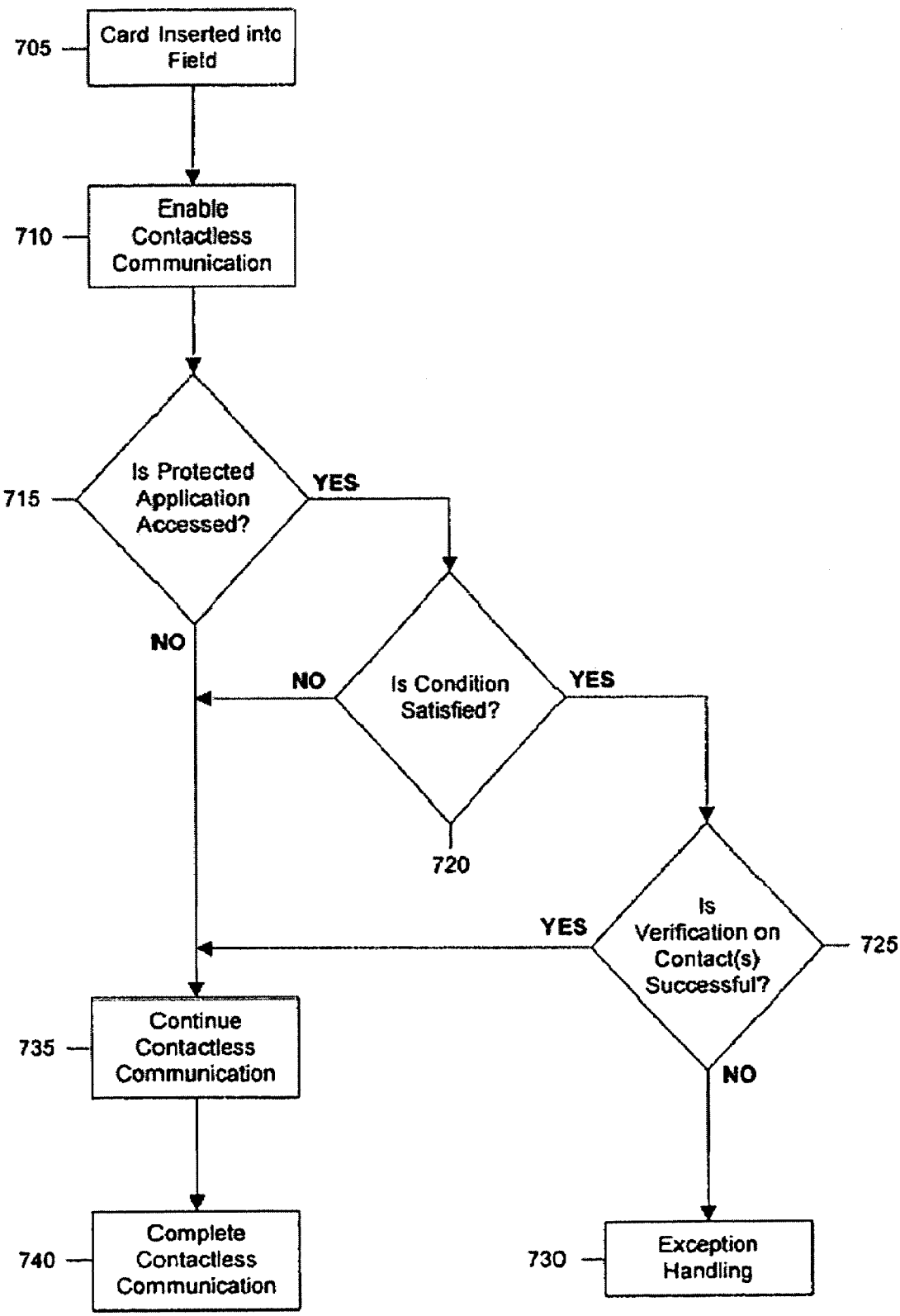

FIG. 7 depicts a flow diagram for a load verification process according to a fourth contactless card embodiment. In the fourth contactless card embodiment, the card may be conditionally protected against contactless communications satisfying certain rules. For example, if a payment transaction is being processed, load verification may be performed if the transaction amount exceeds a predetermined threshold. The partial protection may be assigned on a per application basis and/or for particular types of applications. For all applications, load verification may not be required until a specified condition is met. To perform load verification, a cardholder, for example, may touch one or more sense contacts of the card while presenting the card to a card reader (i.e., bringing the card within a field produced by the card reader). The card may receive power, for example, from the field and may verify that one or more of the sense contacts are loaded while the card is within the field. The load may first be applied while the card is inside or outside of the field.

As shown in FIG. 7, the one or more sense contacts may be unloaded, the card may be brought 705 inside of a field and contactless communication may be enabled 710. The card may determine 715 whether a command from a card reader is directed towards a protected application. If the command is directed towards a protected application, the card may determine 720 whether a specified condition has been satisfied, such as whether a transaction amount has been exceeded by the present transaction. If the transaction amount has been exceeded, the card may determine 725 whether the load has been verified. If the load has not been verified, an exception handling procedure may be performed 730. If the load is verified, the transaction amount is not exceeded and/or the selected application is not protected, the card may continue 735 the contactless communication. The communication session may then eventually complete 740.

Table 4 in FIG. 13, Coverage-Load/Light Verification Table for Fourth Embodiment, may depict the protection coverage and load verification process for the fourth contactless card embodiment. In the embodiment depicted in Table 4, the load may first be applied either inside or outside of the field. The protection coverage may include conditional data protection for payment applications only.

Figure 8:
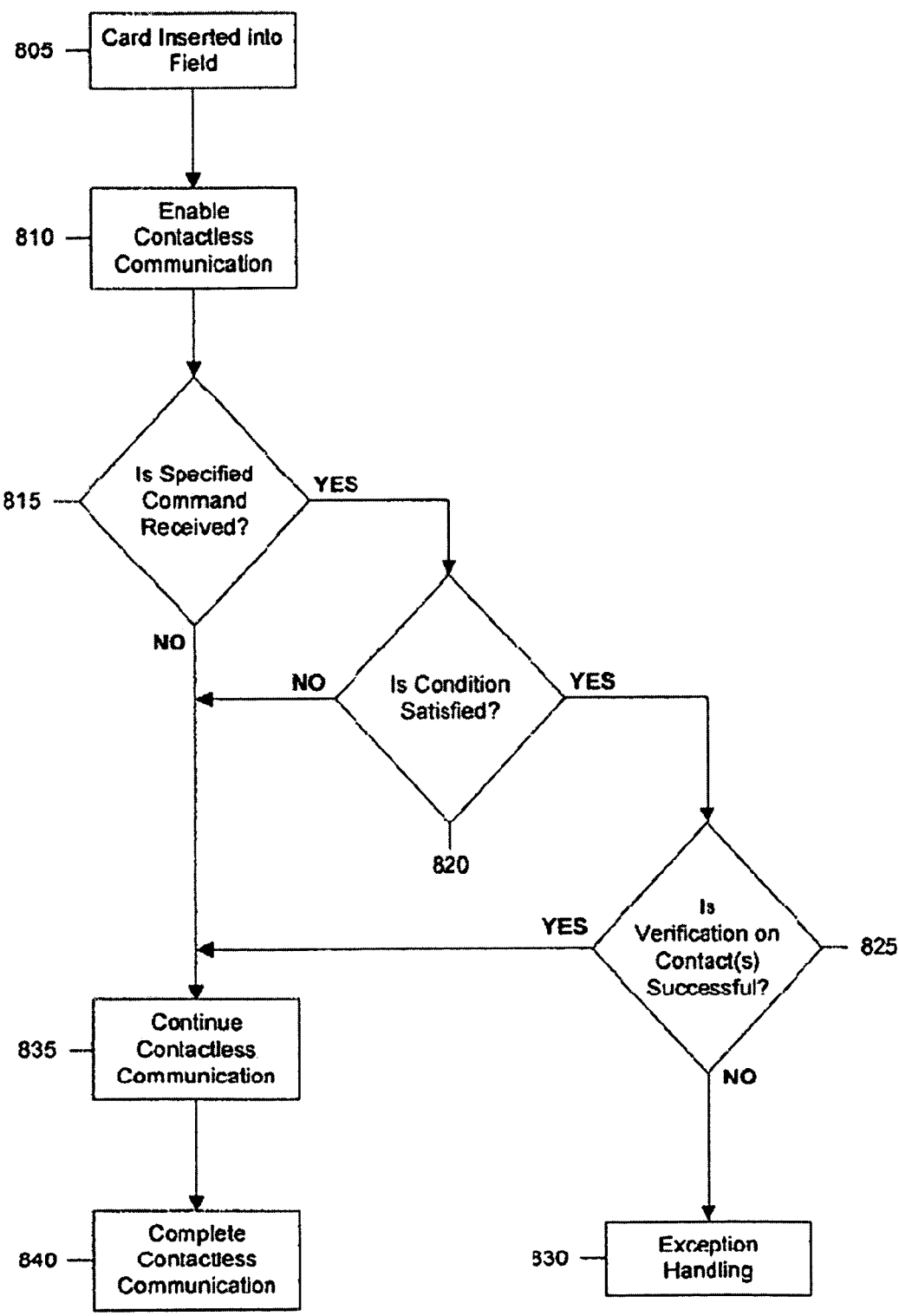

FIG. 8 depicts a flow diagram for a load verification process according to a fifth contactless card embodiment. In the fifth contactless card embodiment, the card may be conditionally protected against contactless communications meeting certain conditions. For example, if a particular type of contactless card includes a payment application and the card reader selects a particular value for a variable, such as the application family identifier, load verification may be performed. The partial protection may be assigned on a per application basis and/or for particular types of applications. For all protected applications, load verification may not be required until a specified condition is met. To perform load verification, a cardholder, for example, may touch one or more sense contacts of the card while presenting the card to a card reader (i.e., bringing the card within a field produced by the card reader). The card may receive power, for example, from the field and may verify that one or more of the sense contacts are loaded while the card is within the field. The load may first be applied while the card is either inside or outside of the field.

As shown in FIG. 8, the one or more sense contacts may be unloaded, the card may be brought 805 inside of a field, and contactless communication may be enabled 810. The card may determine 815 whether at least one of one or more particular commands is received from a card reader. If at least one of the one or more particular commands is received, the card may determine 820, for example, whether a specified condition has been satisfied, such as whether an application family identifier has a particular value. If so, the card may determine 825 whether the load has been verified. If the load has not been verified, an exception handling procedure may be performed 830. If the load is verified, the particular value has not been received and/or at least one of the one or more particular commands is not received, the card may continue 835 the contactless communication. The communication session continue searching for specified conditions until the contactless communication completes 840.

Table 5 in FIG. 14, Coverage-Load/Light Verification Table for Fifth Embodiment, may depict the protection coverage and load verification process for particular specified commands and a particular condition for the fifth contactless card embodiment. In the embodiment depicted in Table 5, the load may first be applied either inside or outside of the field.

The protection coverage may include conditional command-response protection for transactions with specific control and/or data values.

Figure 9:
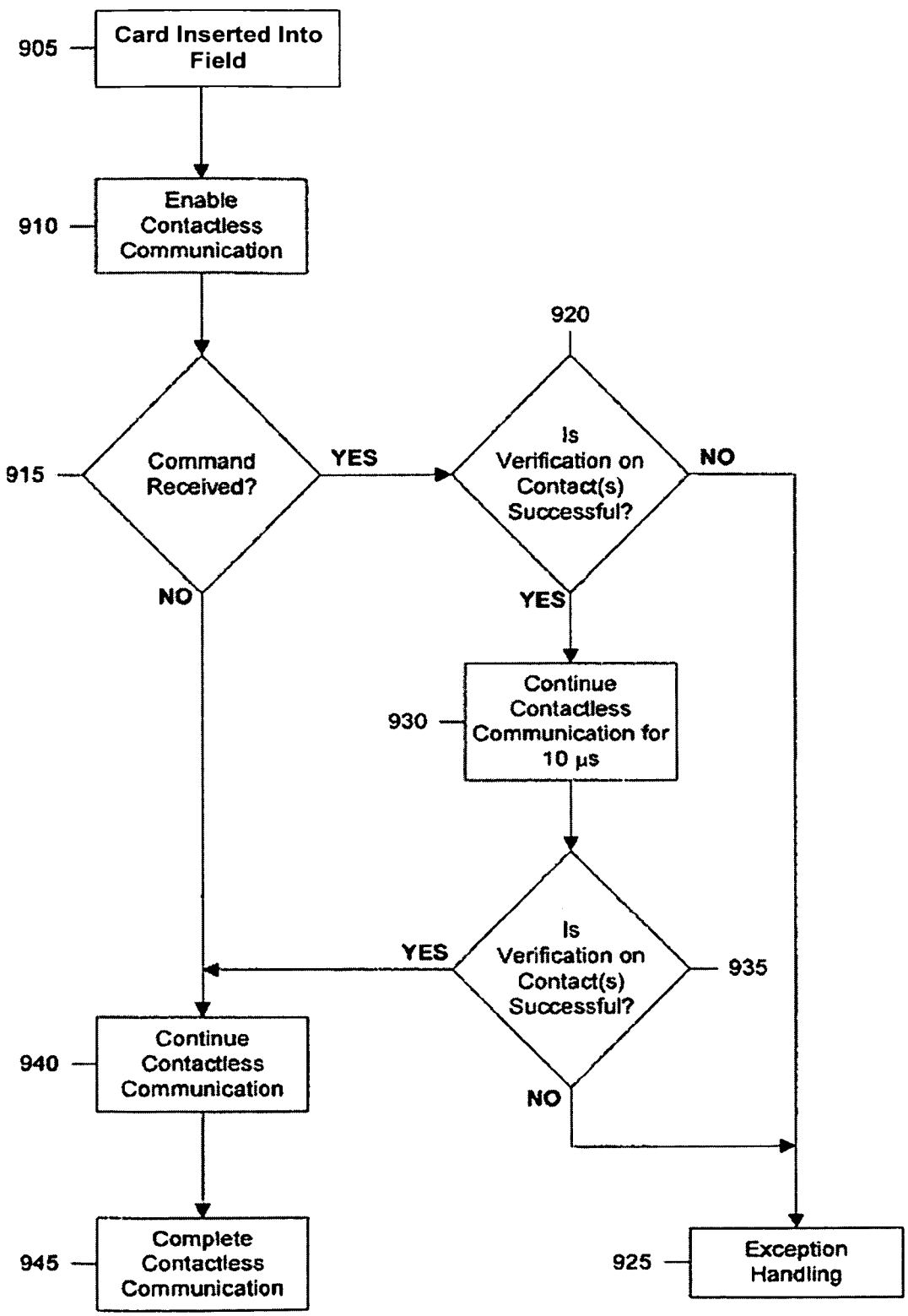

FIG. 9 depicts a flow diagram for a load verification process according to a sixth contactless card embodiment. In the sixth contactless card embodiment, the card may be conditionally protected for all contactless communication. In this embodiment, the protection may be conditional because the load may not be verified until a command is received from a card reader. The load may be verified, for example, twice within a predetermined time period, such as approximately 10 µs. The protection may apply for all frequencies, data, command-response pairs and applications. In an embodiment, the load verification may occur only when the card reader transmits a first command. To perform load verification, a cardholder, for example, may touch one or more sense contacts of the card while presenting the card to the card reader (i.e., bringing the card within a field produced by the card reader). The card may receive power, for example, from the field and may verify that one or more of the sense contacts are loaded when a command is received while the card is within the field. The load may first be applied while the card is either insider or outside of the field.

As shown in FIG. 9, the one or more sense contacts may be loaded or unloaded when the card is inserted 905 into a field. Contactless communication may be enabled 910 when the card is in the field. The card may then determine 915 whether a command is received. If a command is received, the card may determine 920 whether the load is verified. If the load is not verified, an exception handling procedure may be performed 925. If the load is verified, contactless communication may continue 930 for a predetermined time period, such as approximately 10 µs. The card may then again determine 935 whether the load is verified. If the load is not verified, an exception handling procedure may be performed 925. If the load is verified, the card may continue 940 the contactless communication. The communication session may then eventually complete 945.

Table 6 in FIG. 15, Coverage-Load/Light Verification Table for Sixth Embodiment, may depict the protection coverage and load verification process for the sixth contactless card embodiment. In the embodiment depicted in Table 6, the load may first be applied either inside or outside of the field. The protection coverage may include conditional data protection (i.e., a first load verification process) when the card receives the first command. A second load verification process may occur a predetermined time period, such as approximately 10 µs, after the first load verification.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art.

What is claimed is:

1. A method comprising:
   placing a contactless communications apparatus in a protected state, wherein the contactless communications apparatus includes one or more sense contacts in communication with an antenna;
   receiving a selection for an application for a contactless communication session;
   if the selected application is an unprotected application, placing the contactless communications apparatus in an unprotected state;
   if the selected application is a protected application and a load has been placed on at least one of the sense contacts, placing the contactless communications apparatus in the unprotected state; and
   wherein the placing of the contactless communications apparatus in:
      the protected state disables the contactless communications apparatus from conducting a contactless financial transaction on an account of a consumer with a merchant; and
      the unprotected state enables the contactless communications apparatus to conduct the contactless financial transaction on the account of the consumer with the merchant.

2. The method as defined in claim 1, wherein:
   at least one of the sense contacts comprises means for sensing light; and
   the method further comprises:
   determining whether the means for sensing light detects light having one or more of a sufficient intensity, a correct coding, a correct modulation, and a correct frequency, and if not placing the contactless communications apparatus in the protected state.

3. The method as defined in claim 1, further comprising receiving power via an antenna of the contactless communications apparatus from an external field comprising one of an electric field, a magnetic field and an electromagnetic field.

4. The method as defined in claim 2, further comprising placing the contactless communication apparatus in the protected state if the contactless communication apparatus no longer receives power from the external field.

5. The method as defined in claim 1, further comprising placing the contactless communications apparatus in the protected state if the contactless financial transaction completes.

6. The method as defined in claim 1, wherein the determining whether a load has been placed on at least one sense contact of the contactless communications apparatus is performed a plurality of times during the contactless financial transaction.

7. The method as defined in claim 1, wherein the contactless financial transaction includes the exchange of information about the account between the consumer and the merchant.

8. The method as defined in claim 1, further comprising:
   if the selected application is a protected application, determining if a predetermined condition is satisfied, and
   if the predetermined condition is not satisfied, placing the contactless communications apparatus in the unprotected state.

9. The method as defined in claim 1, further comprising:
   determining whether at least one of the light sensors detects light having one or more of a sufficient intensity, a correct coding, a correct modulation, and a correct frequency; and
   if not, placing the contactless communications apparatus in the protected state.

10. A method comprising:
    placing a contactless communications apparatus in a protected state, wherein the contactless communications apparatus has one or more sense contacts in communication with an antenna;
    determining whether a predetermined command is received;
    if the predetermined command was not received, placing the contactless communications apparatus in an unprotected state;

and
if the predetermined command was received, determining whether a condition is satisfied:
if the condition is not satisfied, placing the contactless communications apparatus in the unprotected state; and
if the condition is satisfied, determining whether a load has been placed on at least one of the sense contacts, and if so, placing the contactless communications apparatus in the unprotected state;
and
wherein the placing of the contactless communications apparatus in:
the protected state disables the contactless communications apparatus from engaging in contactless communications to conduct a contactless financial transaction on an account of a consumer with a merchant; and
the unprotected state enables the contactless communications apparatus to engage in contactless communications to conduct the contactless financial transaction on the account of the consumer with the merchant.

11. The method as defined in claim 10, further comprising:
determining whether at least one light sensor detects light having one or more of a sufficient intensity, a correct coding, a correct modulation, and a correct frequency; and
if not, placing the contactless communications apparatus in the protected state.

12. The method as defined in claim 10, further comprising receiving power via the antenna from an external field comprising one of an electric field, a magnetic field and an electromagnetic field.

13. The method as defined in claim 12, further comprising placing the contactless communication apparatus in the protected state if the contactless communication apparatus no longer receives power from the external field.

14. The method as defined in claim 10, further comprising placing the contactless communications apparatus in the protected state if the contactless financial transaction completes.

15. The method as defined in claim 10, wherein the determining whether a load has been placed on at least one sense contact of the contactless communications apparatus is performed a plurality of times during the contactless financial transaction.

16. The method as defined in claim 10, wherein the contactless financial transaction includes the exchange of information about the account between the consumer and the merchant.

17. A method comprising:
placing in a protected state a contactless communications apparatus having:
means for sensing weight;
means for containing programming instructions; and
means, in communication with the means for containing programming instructions, for executing the programming instructions, when the contactless communications apparatus is in an unprotected state;
and
determining whether a command is received by the contactless communications apparatus, and if so:
determining whether a load has been placed on the means for sensing weight, and if so:
placing the contactless communications apparatus in the unprotected state for a predetermined time period, wherein:
at the end of the predetermined time period, determining whether a load has been placed on the means for sensing weight, and if so, the means for executing the programming instructions executes the programming instructions to perform a contactless financial transaction on an account of a consumer with a merchant;
and wherein the contactless communications apparatus, in the protected state, is disabled from contactless communications to conduct a contactless financial transaction on an account of a consumer with a merchant 18. The method as defined in claim 17, wherein:
the contactless communication apparatus includes means for sensing radiation; and
the method further comprises determining whether the means for sensing radiation detects radiation having at least one of sufficient intensity, correct coding, correct modulation, or correct frequency, and, if not, placing the contactless communication apparatus in the protected state.

* * * * *